United States Patent [19]

Nakano et al.

[11] Patent Number: 5,584,525
[45] Date of Patent: Dec. 17, 1996

[54] AUTOMOTIVE SEAT HAVING ROBUST CONSTRUCTION

[75] Inventors: Nobuyuki Nakano, Ashigara-gun; Nobuhiko Takahashi, Yokohama, both of Japan

[73] Assignees: Nissan Motor Co., Ltd., Yokohama; Ikeda Bussan Co., Ltd., Kanagawa Prefecture, both of Japan

[21] Appl. No.: 204,923

[22] Filed: Mar. 2, 1994

[30] Foreign Application Priority Data

Mar. 3, 1993 [JP] Japan .................................. 5-042996
Mar. 3, 1993 [JP] Japan .................................. 5-042998
Mar. 3, 1993 [JP] Japan .................................. 5-042999

[51] Int. Cl.⁶ .................................................. B60N 2/42
[52] U.S. Cl. ........................ 296/68.1; 296/188; 297/216.1
[58] Field of Search ........................... 296/63, 65.1, 68.1, 296/188; 280/748; 297/216.1, 216.13

[56] References Cited

U.S. PATENT DOCUMENTS 5,000,509  3/1991  Sinhuber et al. ................. 296/68.1 X

FOREIGN PATENT DOCUMENTS 49-116723  11/1974  Japan .
49-116724  11/1974  Japan .
53-109233  9/1978   Japan .
53-109234  9/1978   Japan .
57-90225   6/1982   Japan .
3-26652    3/1991   Japan .

*Primary Examiner*—Andrew C. Pike
*Attorney, Agent, or Firm*—Lowe, Price, LeBlanc & Becker

[57] ABSTRACT

An automotive seat comprises a seat slide device mounted on a vehicle floor between a side sill and a tunnel portion. The seat slide device includes a movable rail which moves in a given direction along the side sill. A seat cushion frame is mounted on the movable rail to move therewith, and a seatback frame is pivotally connected to the seat cushion frame through paired pivot devices. A reinforcing structure is incorporated with at least one of the seat cushion frame and the paired pivot devices to provide the seat with a tough resistance against a side vehicle collision. The reinforcing structure includes a reinforcing beam secured to two mounting brackets secured by respective flange plates to the side sill and the tunnel portion. In another aspect of the invention, another bracket is secure to the top of the tunnel portion and also secured to the corresponding flange plate of the reinforcing beam.

2 Claims, 15 Drawing Sheets

AUTOMOTIVE SEAT HAVING ROBUST CONSTRUCTION

BACKGROUND OF THE INVENTION

1. Field of the Invention

The present invention relates in general to automotive seats having a robust construction, and more particularly to automotive seats of a type which is constructed to exhibit excellent mechanical strength against an impact force applied thereto from a lateral direction, due to a side vehicle collision or the like.

2. Description of the Prior Art

Japanese laid-open Utility Model Appln. 53-109233, Japanese laid-open Utility Model 3-26652, and Japanese laid-open Patent Appln. 57-90225 show automotive seats which are constructed to exhibit a marked strength against an impact force applied thereto from a lateral direction. In order to provide the seats with a robust construction for such strength, numerous reinforcing members are used, which are installed in both a seat cushion frame and a seatback frame. However, usage of numerous reinforcing members tends to induce increase in weight of the seat and complicated construction of the same. Particularly, the employment of the numerous parts brings about increase in production cost of the seat, and the increase in weight of the seat brings about poor fuel consumption of the associated motor vehicle.

SUMMARY OF THE INVENTION

It is therefore an object of the present invention to provide an automotive seat which is simple in construction and can exhibit an excellent resistance against such lateral impact force irrespective of reduction in number of reinforcing members employed in the seat.

According to the present invention, there is provided a seat for use in a motor vehicle. The vehicle has a floor, a side sill extending along a side edge of the floor, and a tunnel portion formed on a laterally middle portion of the floor and extending along the side sill. The seat comprises a seat slide device mounted on the floor between the side sill and the tunnel portion, the seat slide device including a movable rail which moves in a given direction along the side sill; a seat cushion frame mounted on the movable rail to move therewith; a seatback frame; paired pivot devices through which the seatback frame is pivotally connected to the seat cushion frame; and a first reinforcing structure incorporated with at least one of the seat cushion frame and the paired pivot devices to provide the seat with a tough resistance against an impact force applied thereto from a direction perpendicular to the given direction, the first reinforcing structure extending substantially perpendicular to the given direction.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Referring to FIGS. 1 to 4 of the drawings, there is shown an automotive seat 1A which is a first embodiment of the present invention.

Figure 1:
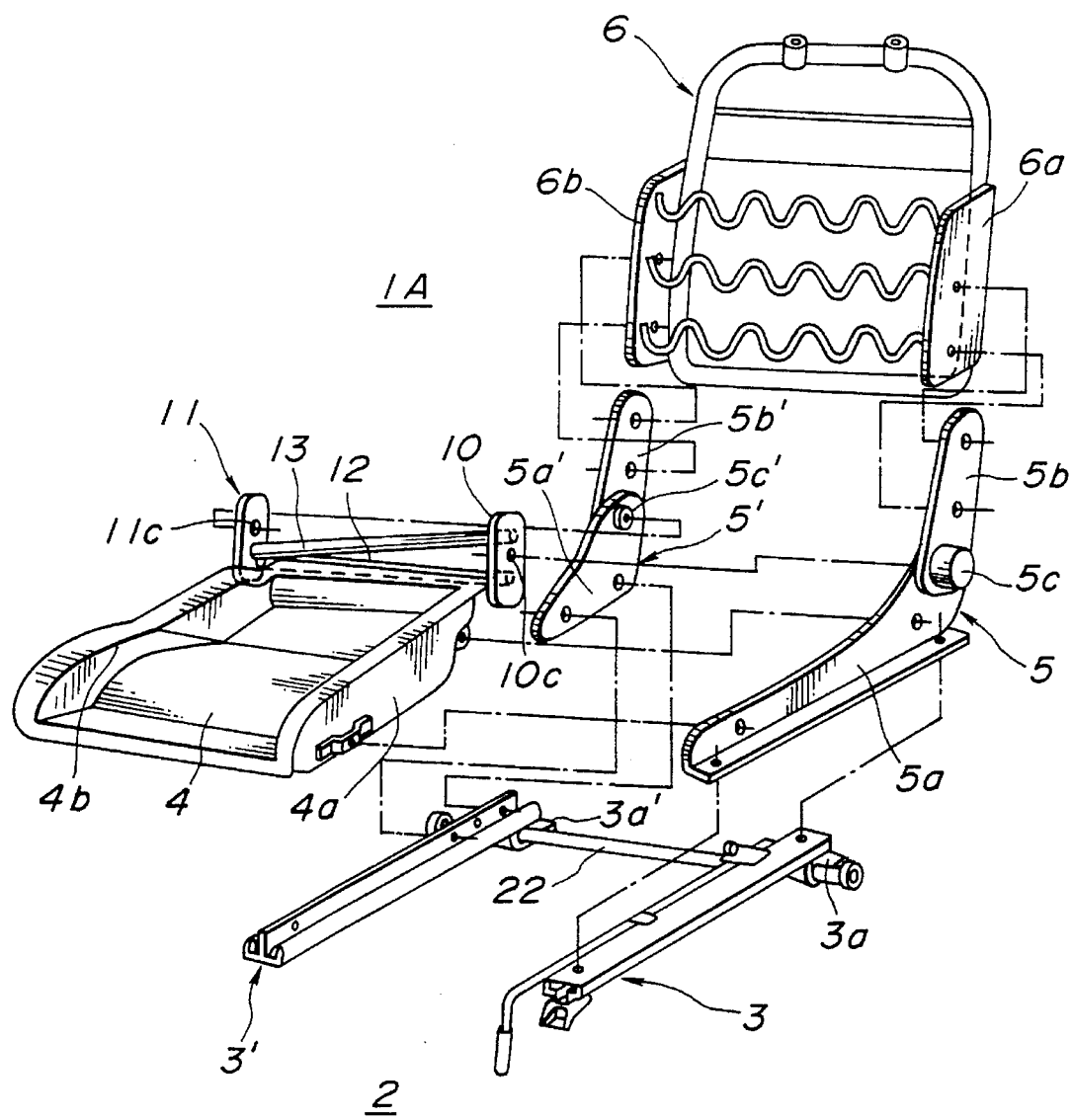
FIG. 1 is an exploded view of an automotive seat which is a first embodiment of the present invention.

As will be seen from FIG. 1, the automotive seat 1A comprises generally seat slide devices 3 and 3' mounted on a vehicle floor 2, a seat cushion frame 4 mounted on the seat slide devices 3 and 3', and a seatback frame 6 mounted through paired pivot devices 5 and 5' on both sides of the seat cushion frame 4.

Between the seat cushion frame 4 and the seatback frame 6, there are provided two, viz., first and second brackets 10 and 11. The first bracket 10 is positioned between an outboard side of the seat cushion frame 4 and an outboard side of the seatback frame 6, while, the second bracket 11 is positioned between an inboard side of the seat cushion frame 4 and an inboard side of the seatback frame 6.

The terms "outboard and inboard" are to be understood with respect to the motor vehicle in which the seat 1A is practically mounted. Thus, as is seen from FIG. 3, upon mounting in the vehicle, the first bracket 10 is positioned near a side door 23 and the second bracket 11 is positioned near a tunnel portion 7 of the vehicle floor 2.

Referring back to FIG. 1, the first and second brackets 10 and 11 are incorporated with the respective pivot devices 5 and 5' in such a manner as will be described hereinafter.

Each of the pivot devices 5 and 5' comprises a base plate 5a or 5a' secured to the seat cushion frame 4, an arm plate 5b or 5b' secured to the seatback frame 6, and a pivot structure 5c or 5c' pivotally connecting the base plate 5a or 5a' and the arm plate 5b or 5b'. Thus, the seatback frame 6 can pivot relative to the seat cushion frame 4 about a common axis of the two pivot structures 5c and 5c'.

Although not shown in the drawings, a known angle adjusting device is incorporated with one of the pivot devices 5 and 5', which can lock a desired angular position of the seatback frame 6 relative to the seat cushion frame 4. This means that the seat 1A is equipped with a so-called "seat reclining device".

The base plates 5a and 5a' are secured to side walls 4a and 4b of the seat cushion frame 4, and the arm plates 5b and 5b' are secured to side walls 6a and 6b of the seatback frame 6.

The detail of the pivot structure 5c or 5c' will become clarified as the description proceeds.

As is seen from FIG. 1, each of the first and second brackets 10 and 11 is formed at a middle portion with an opening 10c or 11c through which a bolt 15 (see FIG. 2) passes. The bolt 15 constitutes a part of the above-mentioned pivot structure 5c or 5c'.

Figure 2:
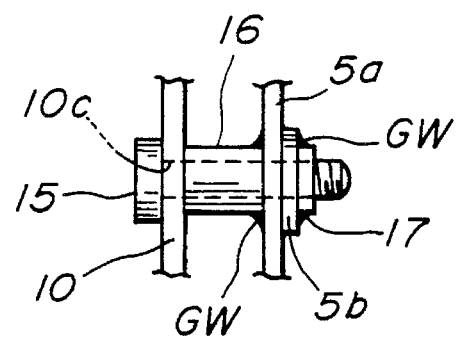
FIG. 2 is an enlarged sectional, but partial, view of a pivot device employed in the automotive seat of the first embodiment.

That is, as is seen from FIG. 2, the bolt 15 passes through the opening 10c or 11c of the first or second bracket 10 or 11, an opening (no numeral) formed in the base plate 5a or 5a', and an opening (no numeral) formed in the arm plate 5b or 5b'. A nut 17 secured, through welding GW, to the arm plate 5b or 5b' is engaged with a threaded leading end portion of the bolt 15. A collar 16 is disposed between the first or second bracket 10 or 11 and the base plate 5a or 5a', which surrounds a shank portion of the bolt 15. The collar 16 is secured, through welding GW, to the base plate 5a or 5a'.

Thus, it will be understood that the arm plate 5b or 5b' can pivot relative to the base plate 5a or 5a' about the axis of the bolt 15, and the first or second bracket 10 or 11 is pivotally supported by the bolt 15.

Figure 3:
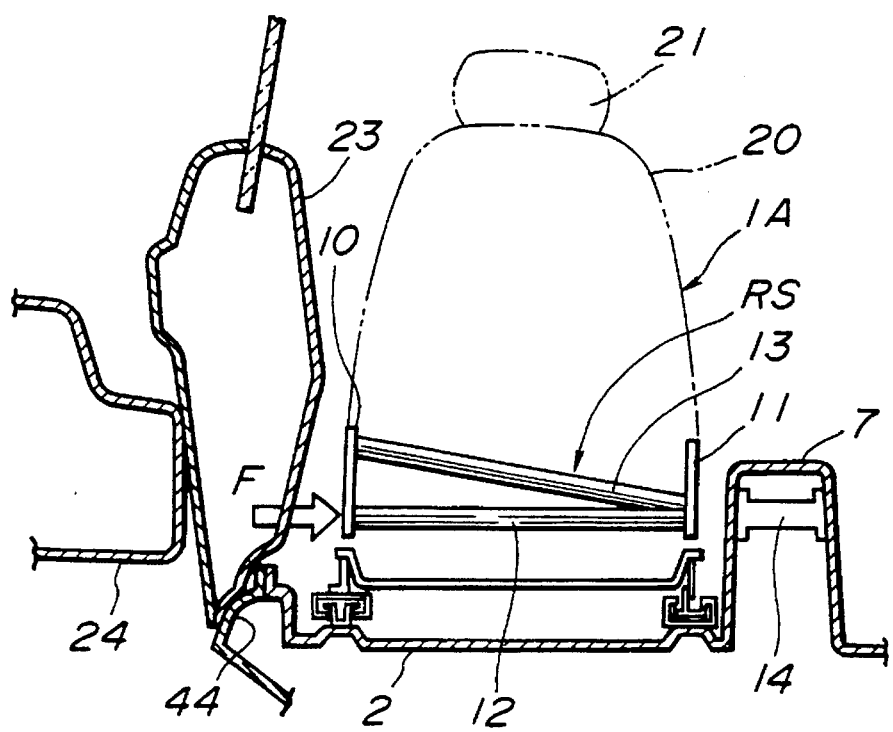
FIG. 3 is a sectional view of the seat of the first embodiment in a condition wherein a side vehicle collision is about to occur.

As will be seen from FIGS. 1 and 3, between the pivotal first and second brackets 10 and 11, there extend first and second cross members 12 and 13. That is, the first cross member 12 extends substantially horizontally between respective lower portions of the first and second brackets 10 and 11, while the second cross member 13 extends obliquely from an upper portion of the first bracket 10 to the lower portion of the second bracket 11.

As is seen from FIG. 3, when practically mounted on the vehicle floor 2, the seat 1A is arranged abreast between a side sill 44 (or side door 23) and a longitudinally extending tunnel portion 7 of the vehicle floor 2 in the illustrated manner. The side sill 44 extends along a side edge of the vehicle floor 2, and the tunnel portion 7 is formed on a laterally middle portion of the floor 2. A beam member 14 is installed in the tunnel portion 7 to extend laterally. The beam member 14 is positioned in the vicinity of the second bracket 11. In this drawing (viz., FIG. 3), a seatback 20 and a head rest 21 are shown.

It is to be noted that the first and second brackets 10 and 11 and the first and second cross members 12 and 13 constitute a robust construction RS which can exhibit a marked mechanical strength against an impact force applied thereto from a lateral direction.

Referring back to FIG. 1, between respective mounting brackets 3a and 3a' through which rear portions of the seat slide devices 3 and 3' are mounted to the vehicle floor 2, there extends a reinforcing beam 22.

In the following, safety action of the automotive seat 1A which would take place upon a side vehicle collision will be described with reference to FIGS. 3 and 4.

When, as is shown in FIG. 3, another motor vehicle 24 collides against the side door 23 with a light impact force F, the force F is transmitted to the mechanically robust construction RS of the seat 1A. More specifically, mainly, the first cross member 12 bears against the impact force F. Thus, the seat 1A is protected from being severely deformed. Even if, due to the vehicle collision, the entirety of the seat 1A is moved inward by such a degree as to push the tunnel portion 7, a severe deformation of the tunnel portion 7 is suppressed due to provision of both the beam member 14 installed in the tunnel portion 7 and another seat (not shown) positioned beside the tunnel portion 7. This means that even when the associated motor vehicle encounters such a side vehicle collision, the seat 1A can provide a seat occupant with a safely accommodating zone.

Figure 4:
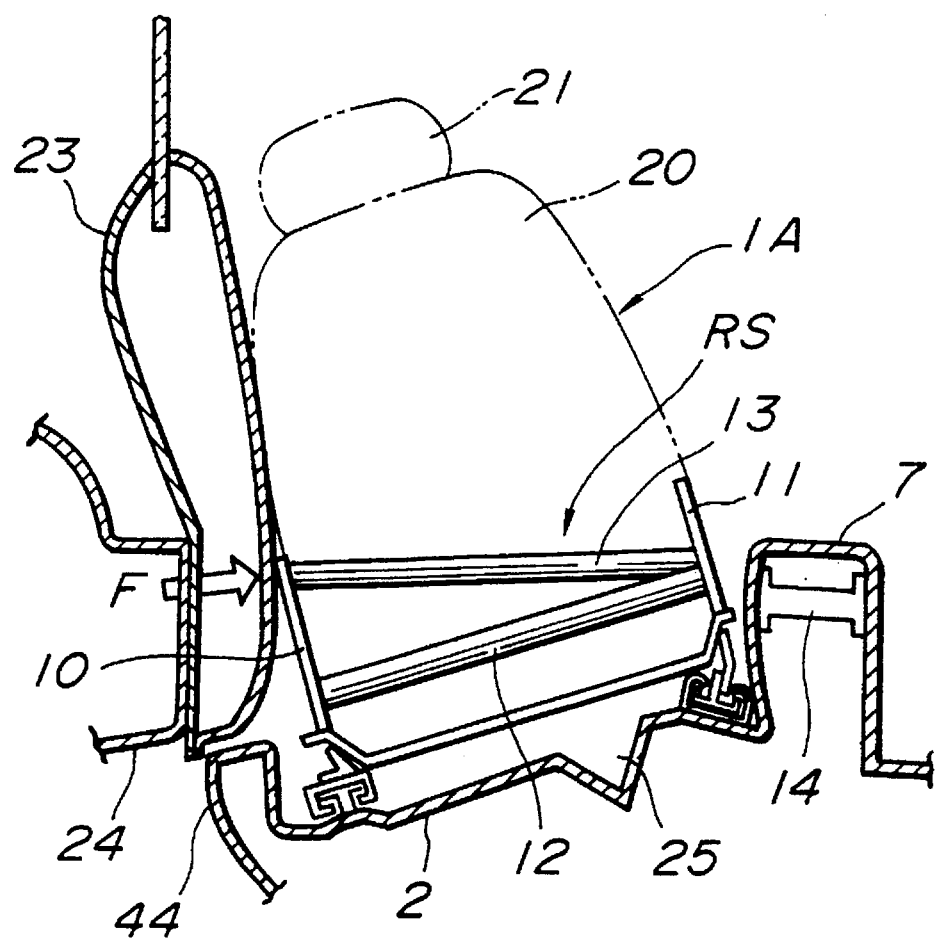
FIG. 4 is a view similar to FIG. 3, but showing a condition wherein the side vehicle collision has just occurred.

When, as will be seen from FIG. 4, the side vehicle collision has such a marked energy as to deform the vehicle floor 2 and thus incline the entirety of the seat 1A outward, the second cross member 13 of the robust construction RS mainly serves to protect the seat 1A from being severely deformed. Of course, provision of the tunnel portion 7 reinforced by the beam member 14 and the other seat (not shown) positioned beside the tunnel portion 7 serves to provide the occupant of the seat 1A with a safely accommodating zone.

Figure 5:
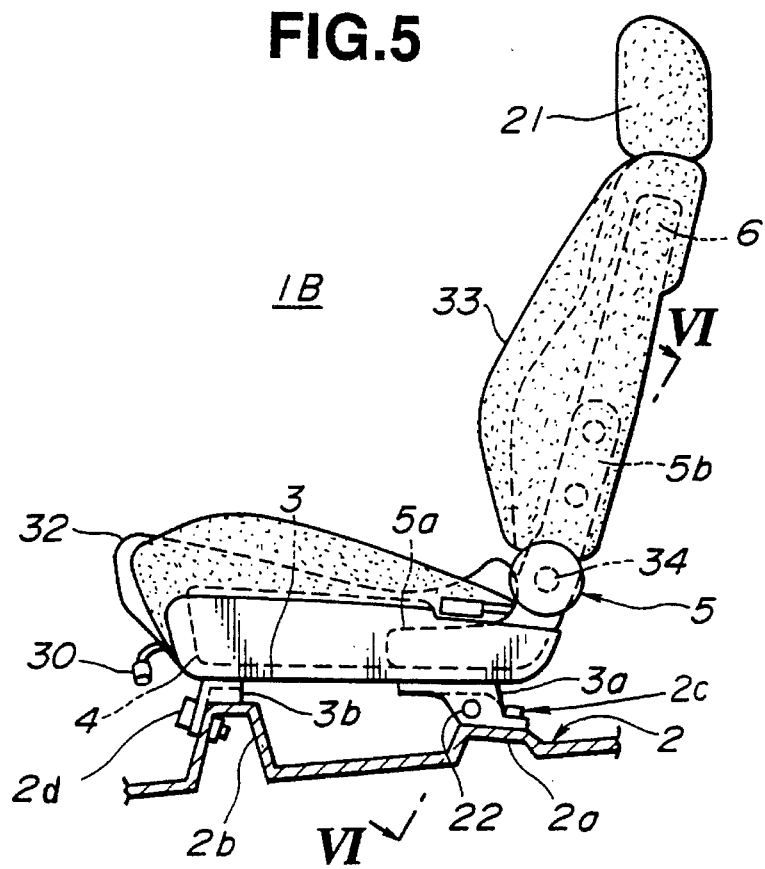
FIG. 5 is a side view of an automotive seat which is a second embodiment of the present invention.
Figure 6:
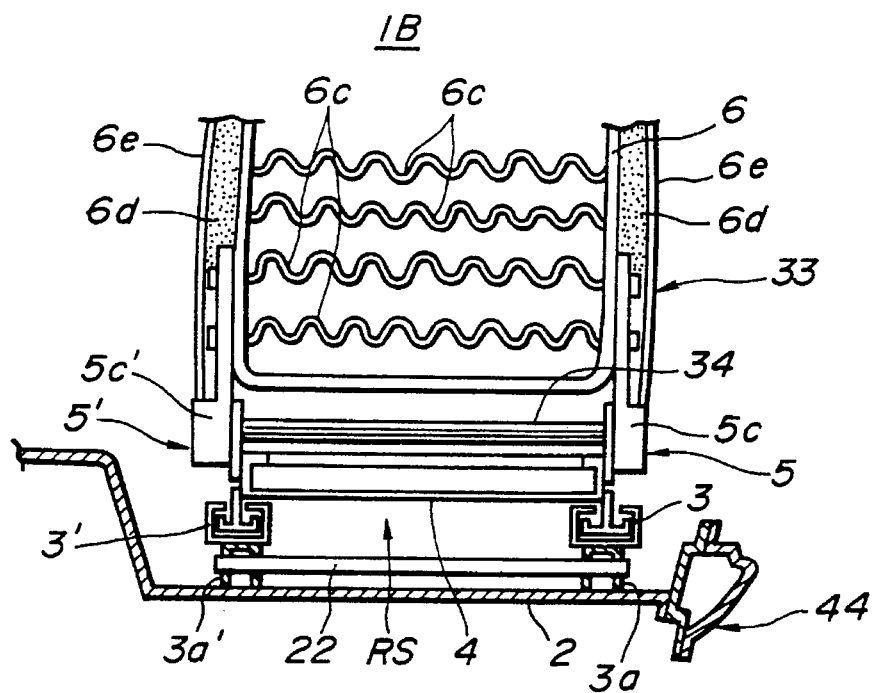
FIG. 6 is a sectional view taken along the line VI—VI of FIG. 5.
Figure 7:
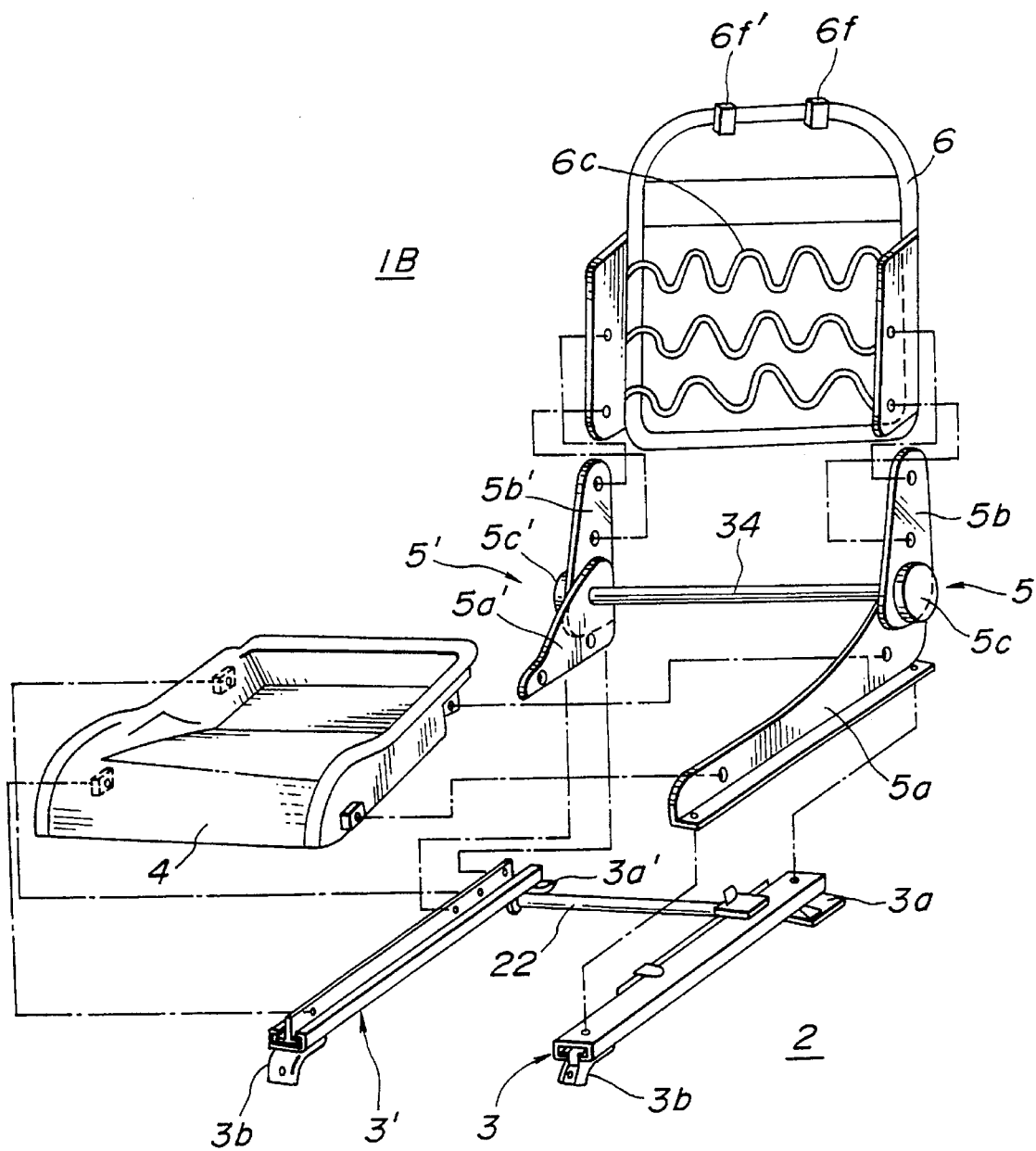
FIG. 7 is an exploded view of the automotive seat of the second embodiment.

Referring to FIGS. 5 to 7, there is shown an automotive seat 1B which is a second embodiment of the present invention.

As will be seen from FIGS. 5 and 7, the seat 1B comprises generally seat slide devices 3 and 3' mounted on a vehicle floor 2, a seat cushion frame 4 mounted on the seat slide devices 3 and 3', and a seatback frame 6 which is mounted through pivot devices 5 and 5' on both sides of the seat cushion frame 4.

Each seat slide device 3 or 3' is mounted through rear and front mounting brackets 3a and 3b (or 3a' and 3b') on spaced raised portions 2a and 2b of the vehicle floor 2. The front raised portion 2b extends laterally to form a ridge structure on the vehicle floor 2. Bolts 2c and 2d are used for securing the mounting brackets 3a, 3b, 3a', and 3b' to the vehicle floor 2.

Each seat slide device 3 or 3' comprises a fixed rail secured to the vehicle floor 2 and a movable rail slidably mounted on the fixed rail. The movable rail mounts thereon the seat cushion frame 4, so that the seat cushion frame 4 can slide forward and rearward relative to the vehicle floor 2. The seat slide devices 3 and 3' are equipped with a position adjusting lever 30. By manipulating the lever 30, the seat cushion 4 can be moved to and locked at a desired position relative to the vehicle floor 2 (viz., the fixed rails).

As is seen from FIG. 7, the seat cushion frame 4 is generally rectangular in shape and constructed of a steel plate. Although not shown in the drawing, a plurality of S-shaped springs extend between opposed side walls of the frame 4 and a cushion pad is mounted on the springs. The cushion pad may be constructed of a foamed polyurethane or the like. An outer skin (not shown) constructed of polyvinyl chloride or the like covers the entire seat cushion frame 4. With these parts, a seat cushion of the seat 1B is produced, which is designated by numeral 32 in FIG. 5.

As is seen from FIG. 7, the seatback frame 6 is generally rectangular in shape and preferably constructed of a steel pipe. A plurality of S-shaped springs 6c extend between opposed sides of the frame 6. As will be understood from FIG. 6, a cushion pad 6d is mounted on the springs 6c, and an outer skin 6e covers the entire seatback frame 6. The cushion pad 6d may be constructed of a foamed polyurethane or the like. With these parts, a seat back of the seat 1B is produced, which is designated by numeral 33 in FIG. 5.

Referring back to FIG. 7, the seatback frame 6 is equipped at its upper portion with two holders 6f and 6f by which a head rest 21 (see FIG. 5) is held.

Each of the pivot devices 5 and 5' comprises a base plate 5a or 5a' secured to the seat cushion frame 4 and an arm plate 5b or 5b' secured to the seatback frame 6 and a pivot structure 5c or 5c' pivotally connecting the base plate 5a or 5a' and the arm place 5b or 5b'. Thus, the seatback frame 6 can pivot relative to the seat cushion frame 4 about a common axis of the two pivot structures 5c and 5c'. The base plates 5a and 5a' are secured by bolts to the upper rails of the seat slide devices 3 and 3'.

A known angle adjusting device is incorporated with one of the pivot devices 5 and 5' to lock the seatback frame 6 at a desired angular position relative to the seat cushion frame 4.

As is best seen from FIG. 7, between the rear mounting brackets 3a and 3a' of the seat slide devices 3 and 3', there extends a first reinforcing pipe 22.

Furthermore, between the two pivot devices 5 and 5', there extends a second reinforcing pipe 34. Preferably, the first and second reinforcing pipes 22 and 34 are constructed of steel. That is, each end of the second reinforcing pipe 34 receives therein an inwardly projected end of a pivot shaft (not shown) by which the base plate 5a or 5a' and the arm plate 5b or 5b are pivotally connected. The manner in which the inwardly projected end of the pivot shaft is incorporated with the pipe 34 may be understood from FIG. 2.

Figure 8:
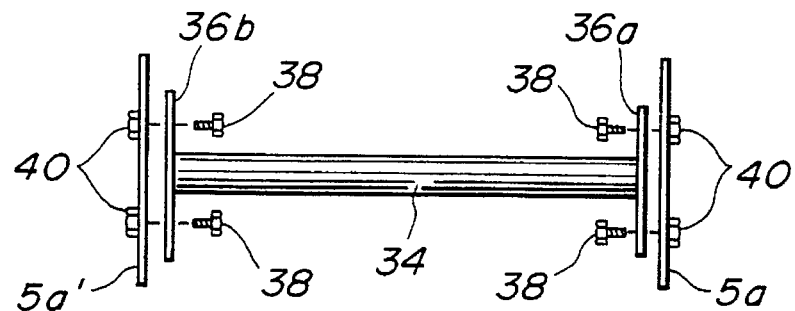
FIG. 8 is a view of a disassembled first modification of a second reinforcing member employed in a seat according to the second embodiment.
Figure 9:
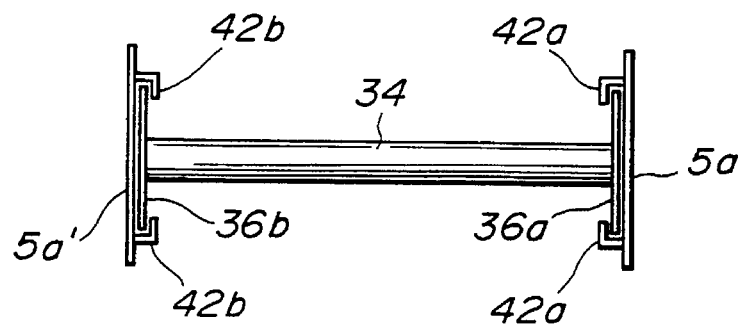
FIG. 9 is a view of a second modification of a second reinforcing member employed in a seat according to the second embodiment.
Figure 10:
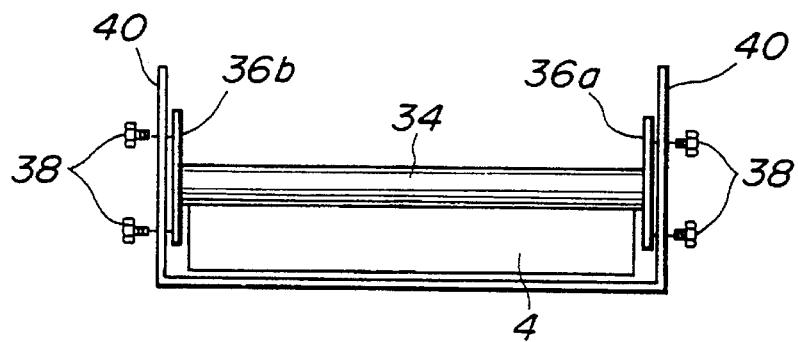
FIG. 10 is a view of a disassembled third modification of a second reinforcing member in a seat according to the second embodiment.

In place of the arrangement of the second reinforcing pipe 34 shown in FIG. 7, other arrangements of the pipe 34 are usable in the second embodiment, which are shown in FIGS. 8, 9, and 10, respectively.

In the arrangement of FIG. 8, flange plates 36a and 36b are welded to both ends of the reinforcing pipe 34. Each flange plate 36a or 36b is secured to the base plate 5a or 5a' by means of bolts 38 and nuts 40. Preferably, the nuts 40 are welded to the base plate 5a or 5a' for simplifying the assembling process.

In the arrangement of FIG. 9, holders 42a and 42b are welded to inboard surfaces of the base plates 5a and 5a', and the flange plates 36a and 36b of the reinforcing pipe 34 are held by the holders 42a and 42b.

In the arrangement of FIG. 10, the flange plates 36a and 36b of the reinforcing pipe 34 are respectively secured to opposed side walls of the seat cushion frame 4 by means of bolts 38. That is, the reinforcing pipe 34 horizontally extends between the opposed side walls of the seat cushion frame 4. If desired, a seat lifter 40 may be incorporated with the seat cushion frame 4.

It is to be noted that the first reinforcing pipe 22, the second reinforcing pipe 34, and their associated members constitute a robust construction RS which can exhibit a marked mechanical strength against an impact force applied thereto from a lateral direction. More specifically, the laterally extending front raised portion 2b of the vehicle floor 2, the seat slide devices 3 and 3', the rectangular seat cushion frame 4, the pivot devices 5 and 5', the first reinforcing pipe 22, and the second reinforcing pipe 34 constitute a generally rectangular structurally basic unit RS for the seat 1B.

Thus, even when a marked shock is suddenly applied to the side portion of the seat 1B due to a side vehicle collision or the like, the seat 1B is prevented from being severely deformed. That is, even in the collision, the seat 1B can provide a seat occupant with a safely accommodating zone. It is further to be noted that the rectangular structurally basic unit RS installed in the seat 1B can reinforce the vehicle floor 2.

Figure 11:
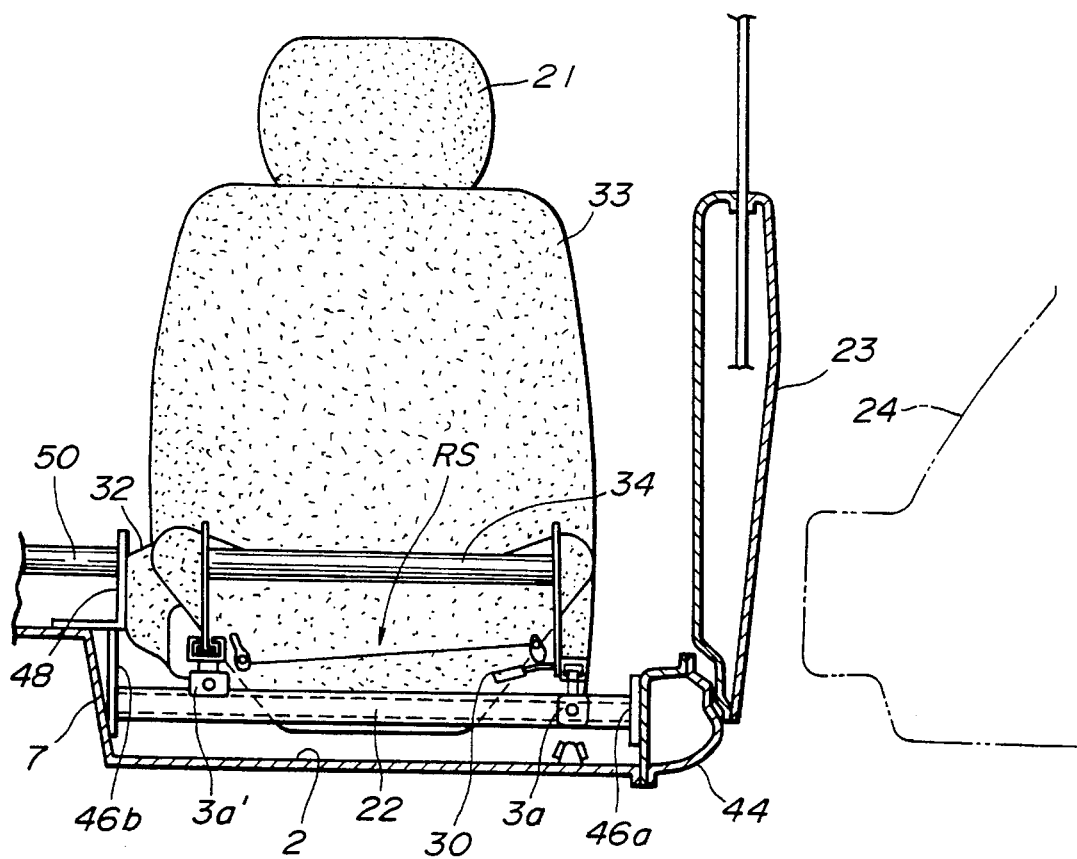
FIG. 11 is a sectional front view of an automotive seat which is a third embodiment of the present invention.

Referring to FIG. 11, there is shown an automotive seat 1C which is a third embodiment of the present invention.

Since the seat 1C of this third embodiment is similar to the seat 1B of the above-mentioned second embodiment, only parts and constructions which are different from those of the second embodiment will be described in detail in the following.

In this third embodiment, as is seen from the drawing, the first reinforcing pipe 22 connecting the rear mounting brackets 3a and 3a' of the seat slide devices 3 and 3' extends between the side sill 44 and the tunnel portion 7. To achieve assured connection to the side sill 44 and the tunnel portion 7, the pipe 22 has flange plates 46a and 46b welded to both ends thereof. The flange plate 46b is secured to a bracket 48 which is secured to a top of the tunnel portion 7. Although not shown in the drawing, another bracket is also secured to the top of the tunnel portion 7 in such manner that these two brackets face each other. A beam member 50 extends between the two brackets 48.

Also in this third embodiment, a generally rectangular structurally basic unit RS can be defined in the seat 1C, like in the case of the above-mentioned second embodiment. Furthermore, since, in the third embodiment, the first reinforcing pipe 22 extends between the side sill 44 and the tunnel portion 7, the structurally basic unit RS has much greater strength than that of the second embodiment.

Thus, even when a marked shock is suddenly applied to the side portion of the seat 1C due to a side vehicle collision or the like, the seat 1C is prevented from being severely deformed. That is, even in the collision, the seat 1C can provide a seat occupant with a safely accommodating zone. It is to be noted that, due to provision of the longer first reinforcing pipe 22, undesired deformation of the vehicle floor 2 can be suppressed or at least minimized.

If, due to a marked vehicle collision, the entirety of the seat 1C is forced to move inward by such a degree as to push the tunnel portion 7, a severe deformation of the tunnel portion 7 is suppressed due to provision of both the beam member 50 installed on the tunnel portion 7 and another seat (not shown) positioned beside the tunnel portion 7. This means that even when the associated motor vehicle encounters a side vehicle collision, the seat 1C can provide a seat occupant with a safely accommodating zone.

Figure 12:
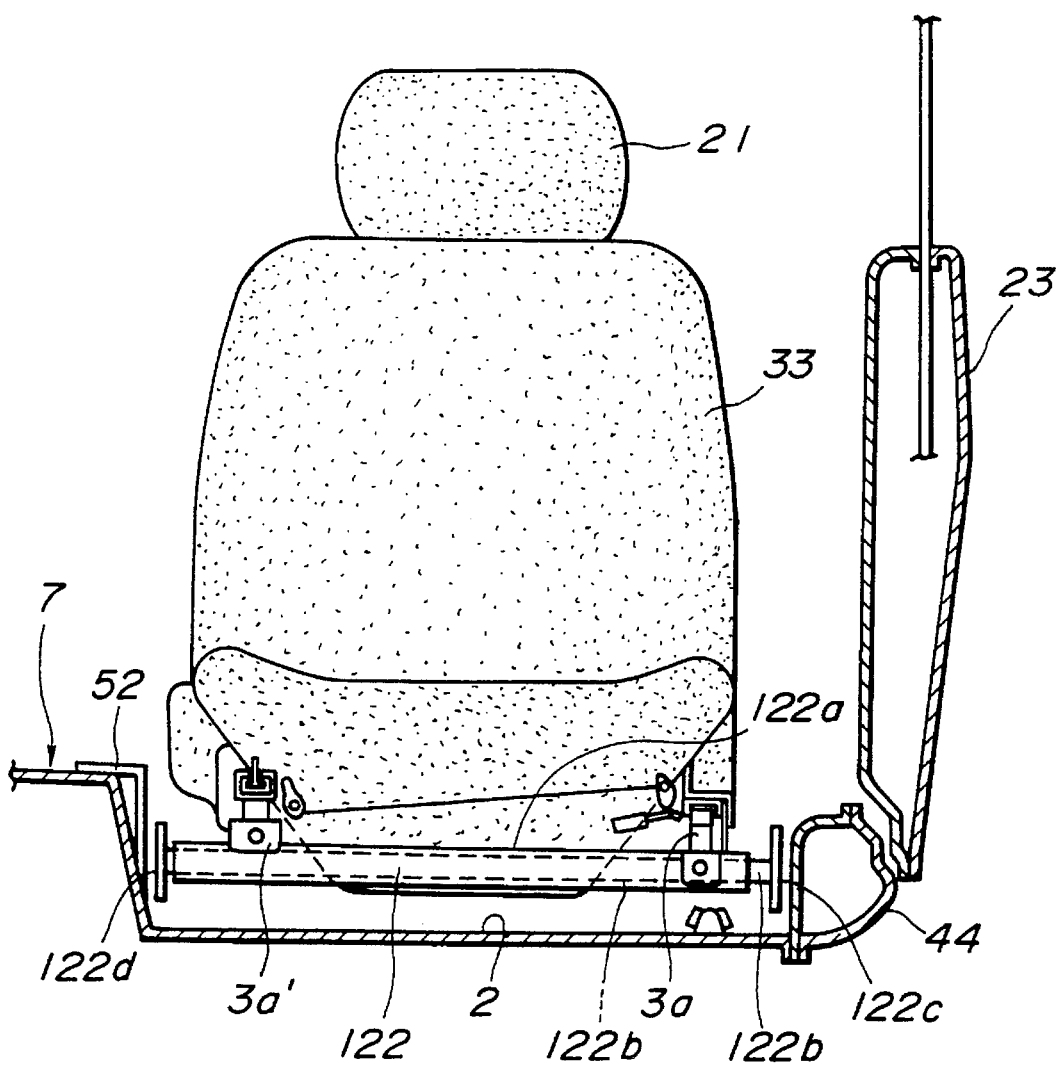
FIG. 12 is a view similar to FIG. 11, but showing a fourth embodiment of the present invention.
Figure 13:
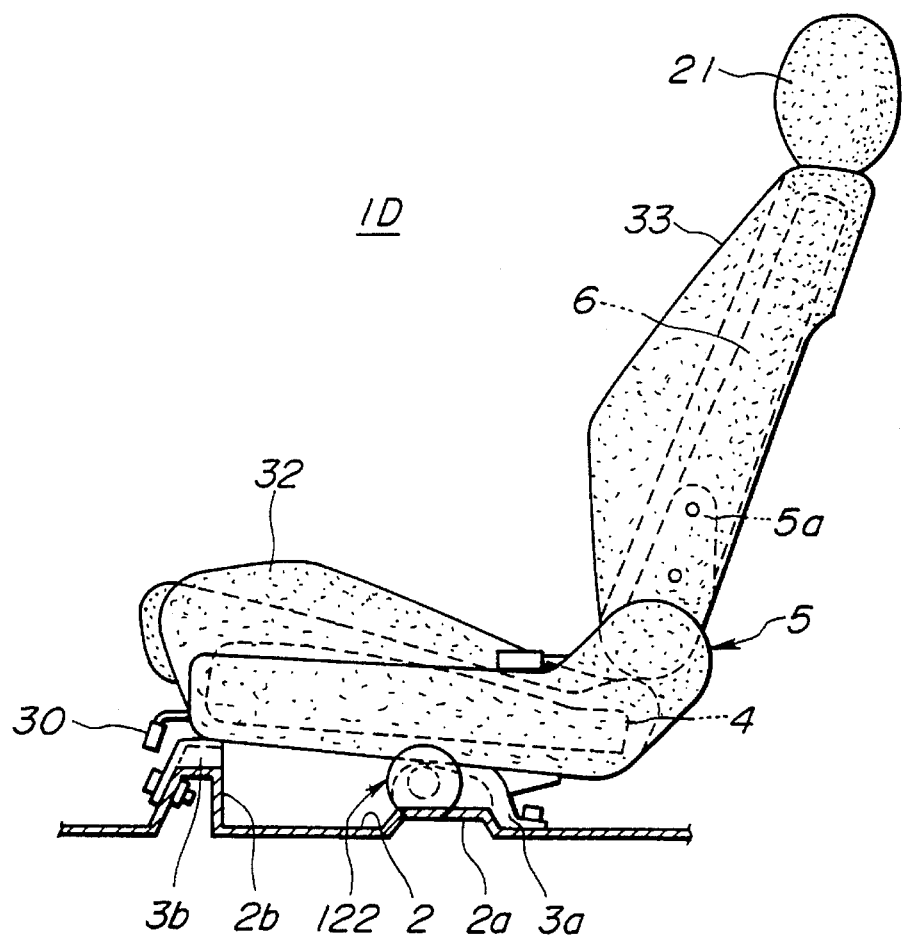
FIG. 13 is a side view of the automotive seat of the fourth embodiment of FIG. 12.
Figure 14:
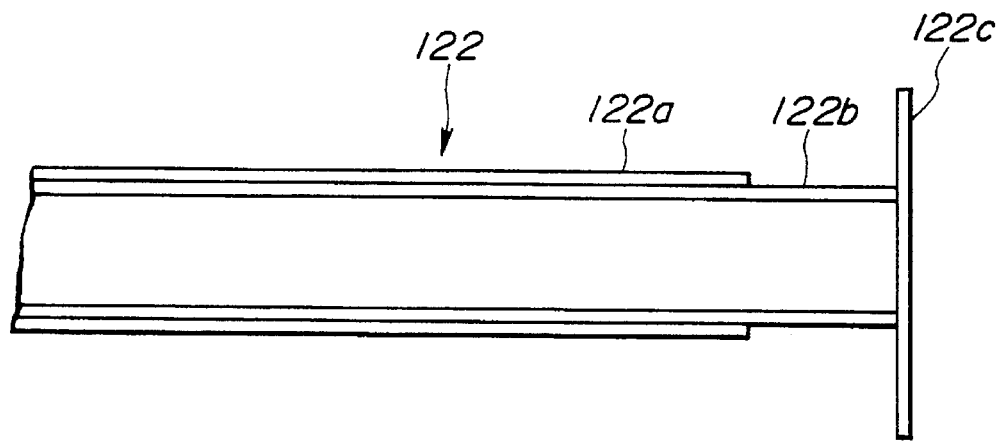
FIG. 14 is a view showing a first reinforcing member employed in the fourth embodiment.

Referring to FIGS. 12 to 14, there is shown an automotive seat 1D which is a fourth embodiment of the present invention.

Also the seat 1D of this fourth embodiment is similar to the seat 1B of the second embodiment. Thus, only parts and constructions which are different from those of the second embodiment will be described in detail in the following.

In this fourth embodiment, as a substitute for the above-mentioned first reinforcing pipe 22, a reinforcing pipe unit 122 is employed.

That is, as seen from FIG. 14, the reinforcing pipe unit 122 comprises an outer pipe 122a which is secured to the rear brackets 3a and 3a' of the seat slide devices 3 and 3', an inner pipe 122b tightly disposed in the outer pipe 122a, and two flange plates 122c and 122d secured to both exposed ends of the inner pipe 122b. The longer inner pipe 122b is connected to the mounting brackets 3a and 3a'. The coupling between the outer and inner pipes 122a and 122b may be effected by a friction force generated therebetween.

As is seen from FIG. 12, upon assembly, the flange plates 122c and 122d are spaced from the side sill 44 and the tunnel portion 7 respectively. An L-shaped bracket 52 is secured to the tunnel portion 7 to provide a flat clearance between the bracket 52 and the inside flange plate 122d. Preferably, the distance between the bracket 52 and the inside flange plate 122d and the distance between the side sill 44 and the outside flange plate 122c are equal.

Thus, in this fourth embodiment, the transmission of the impact force to the tunnel portion 7 starts when, due to a side vehicle collision or the like, the side sill 44 is deformed to push the reinforcing pipe unit 122 to a position where the inside flange plate 122d abuts against the tunnel portion 7 (more specifically, the bracket 52).

In place of the reinforcing pipe unit 122 of FIG. 14, other types are usable in this fourth embodiment, which are shown in FIGS. 15, 16, 17, and 18.

Figure 15:
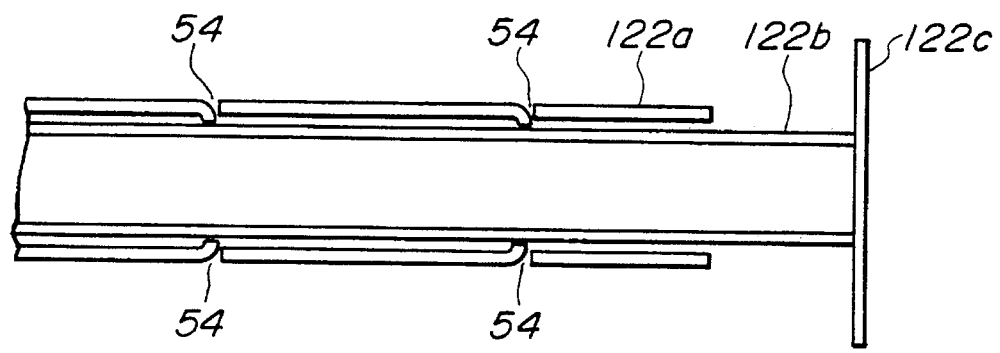
FIG. 15 is a partial cross-sectional view of a first modification of a first reinforcing member as employed in the fourth embodiment.

In the reinforcing pipe unit shown in FIG. 15, the outer pipe 122a is formed with a plurality of inwardly bent pawls 54. With these pawls 54, the tight coupling between the outer pipe 122a and the inner pipe 122b is much assured.

Figure 16:
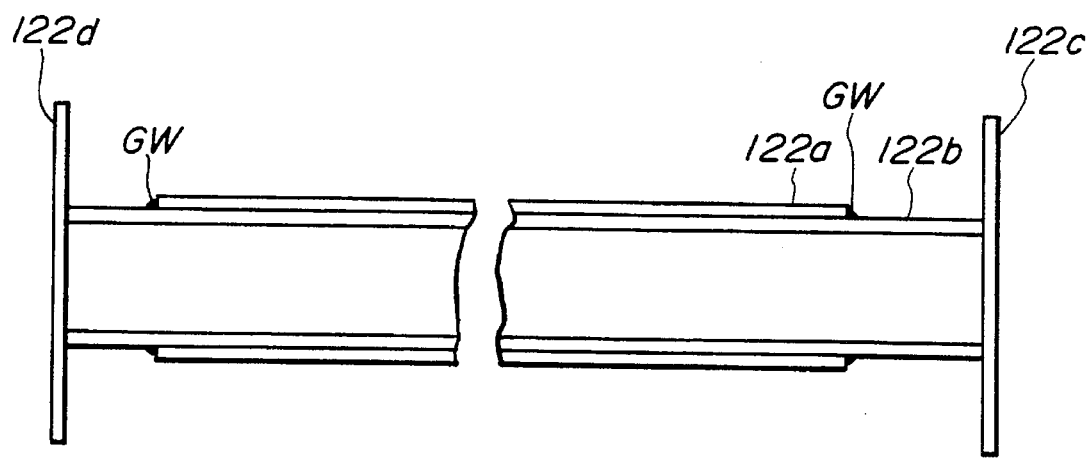
FIG. 16 is a cross-sectional view of a second modification of a first reinforcing member as employed in the fourth embodiment.

In the reinforcing pipe unit shown in FIG. 16, the longitudinal ends of the outer pipe 122a are welded to the inner pipe 122b. The welded portions are denoted by reference GW.

Figure 17:
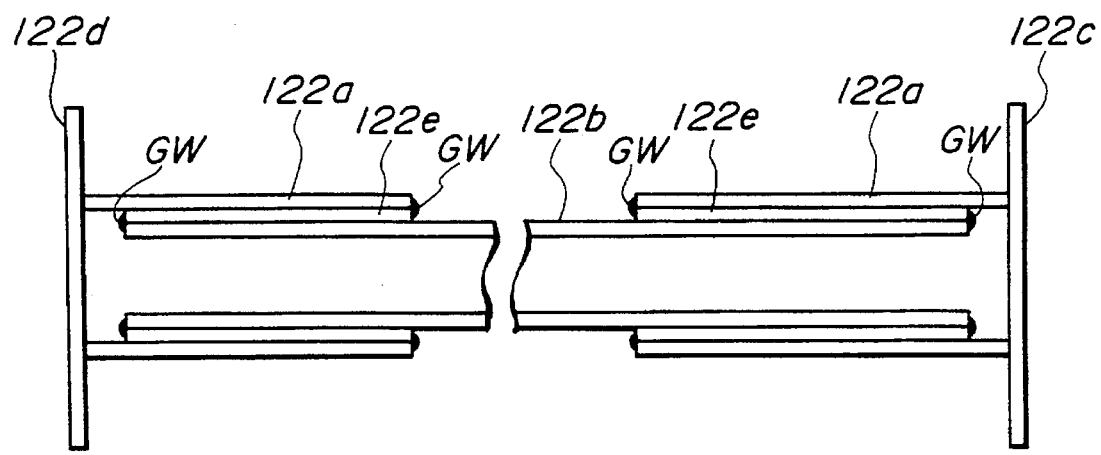
FIG. 17 is a cross-sectional view of a third modification of a first reinforcing member as employed in the fourth embodiment.

In the reinforcing pipe unit shown in FIG. 17, a longer inner pipe 122b, two shorter intermediate pipes 122e and two shorter outer pipes 122a are used. As shown, the two shorter intermediate pipes 122e are disposed about respective end portions of the longer inner pipe 122b, and welding is applied to mated ends of them. The two outer pipes 122a are disposed about the intermediate pipes 122e, and welding is applied to mated ends of them. The welded portions are denoted by reference GW. The flange plates 122c and 122d are secured to projected ends of the outer pipes 122a respectively.

Figure 18:
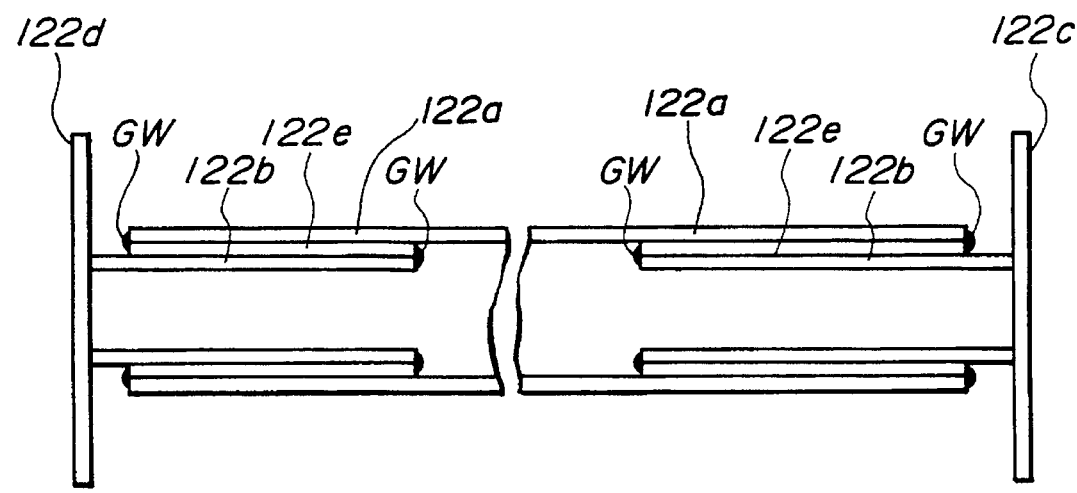
FIG. 18 is a cross-sectional view of a fourth modification of a first reinforcing member as employed in the fourth embodiment.

In the reinforcing pipe unit shown in FIG. 18, two shorter inner pipes 122b, two shorter intermediate pipes 122e and a longer outer pipe 122a are used. As shown, the two shorter intermediate pipes 122e are disposed about the two inner pipes 122b respectively, and welding is applied to mated ends of them. The intermediate pipes 122e are respectively disposed in end portions of the longer outer pipe 122a, and welding is applied to mated ends of them. The welded portions are denoted by reference GW. The flange plates 122c and 122d are secured to projected end of the inner pipes 122b respectively.

Referring to FIGS. 19 to 23, there is shown an automotive seat 1E which is a fifth embodiment of the present invention.

Figure 19:
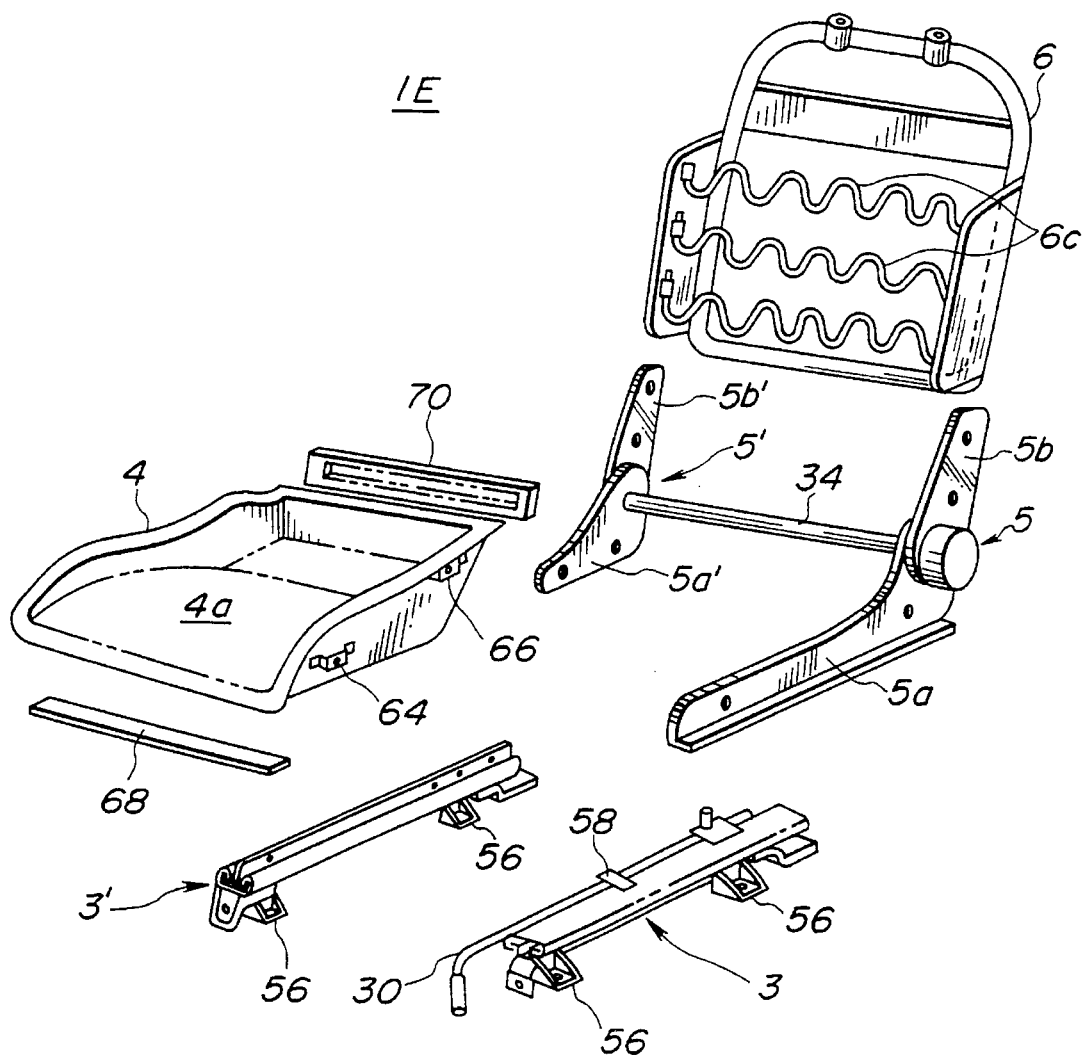
FIG. 19 is an exploded view of an automotive seat which is a fifth embodiment of the present invention.
Figure 20:
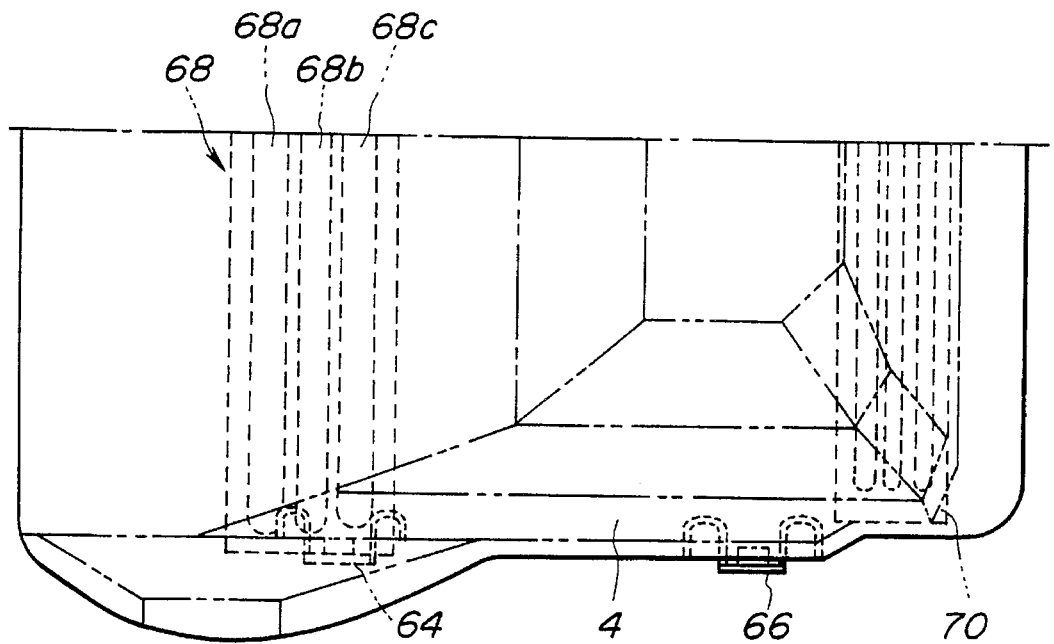
FIG. 20 is a plan, but partial, view of a seat cushion frame of the seat of the fifth embodiment.

As is seen from FIG. 19, the seat 1E comprises generally seat slide devices 3 and 3' mounted on a vehicle floor 2, a seat cushion frame 4 mounted on the seat slide devices 3 and 3', and a seatback frame 6 mounted through pivot devices 5 and 5' on both sides of the seat cushion frame 4.

Each seat slide device 3 or 3' comprises a fixed rail which is secured through after-mentioned two mounting brackets 56 to the vehicle floor 2, and a movable rail which is slidably engaged with the fixed rail and carries thereon the seat cushion frame 4. As will be seen from FIG. 19, the seat slide device 3 and the other seat slide device 3' have a reversed construction. The seat slide device 3 has a position adjusting lever 30. Designated by numeral 58 is a latch mechanism which is controlled by the lever 30. That is, when the lever 30 is pulled by a seat occupant, the latch mechanism 58 cancels the latched engagement between the fixed rail and the movable rail. Thus, while the level 30 is kept pulled, the seat 1E can move to a desired position. When thereafter the lever 30 is released, the latch mechanism 58 latches the movable rail to the fixed rail. Thus, under this condition, the new position of the seat 1E is locked.

Figure 22:
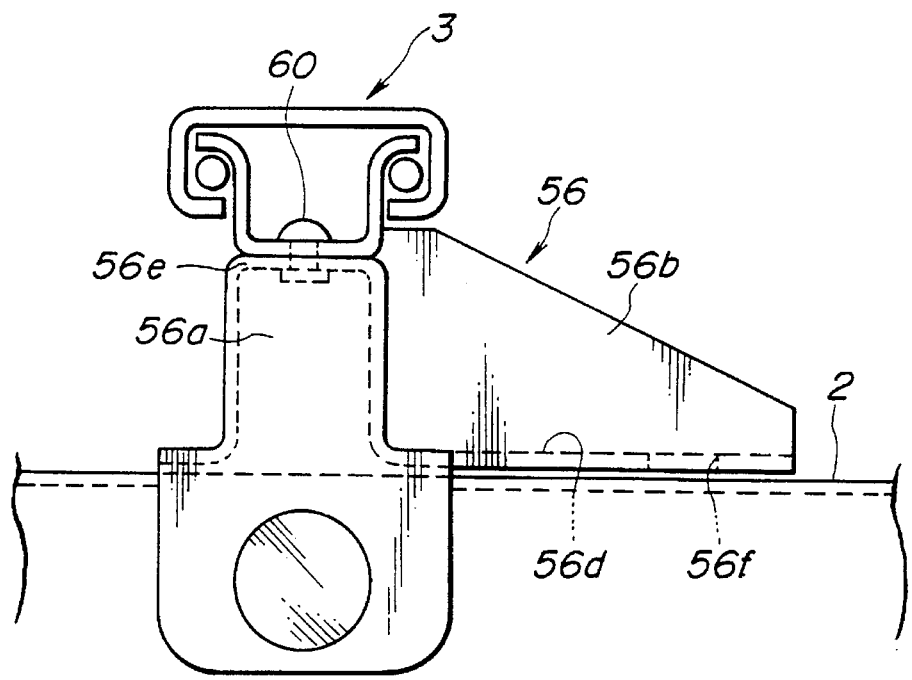
FIG. 22 is an enlarged front view of a part of a seat slide device which is associated with the automotive seat of the fifth embodiment.
Figure 23:
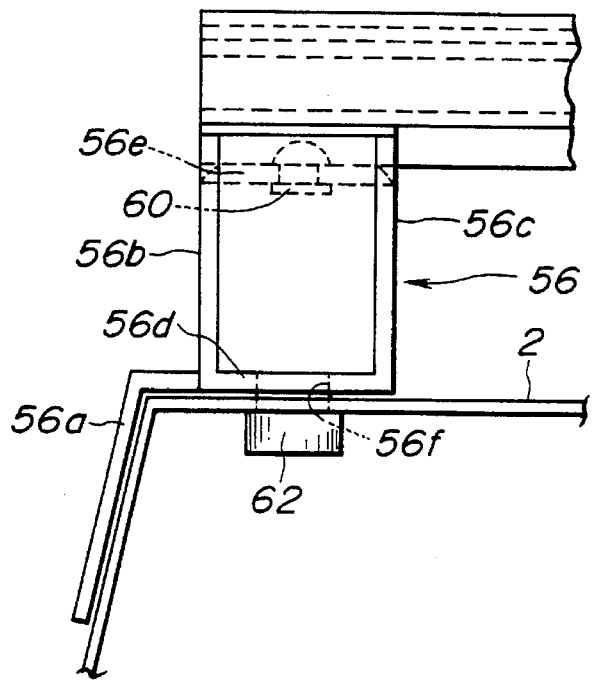
FIG. 23 is a side view of the part of the seat slide device of FIG. 22.

As will be seen from FIGS. 22 and 23, each mounting bracket 56 for the seat slide device 3 or 3' comprises a bent base portion 56a mounted on the vehicle floor 2, front and rear walls 56b and 56c raised from a major portion 56d of the base portion 56a, and an upper wall 56e connecting upper ends of the front and rear walls 56b and 56c. As is seen from FIG. 22, the front and rear walls 56b and 56c extend laterally over the vehicle floor 2. This is intended for providing the seat slide rails 3 and 3' with a sufficient resistance against a force applied thereto from a lateral direction. The upper wall 56e is secured to the fixed rail of the seat slide device through a rivet 60. The major portion 56d is formed with an opening 56f through which a bolt (not shown) extends. For connecting the bolt, a nut 62 is secured to a lower surface of the vehicle floor 2.

Figure 21:
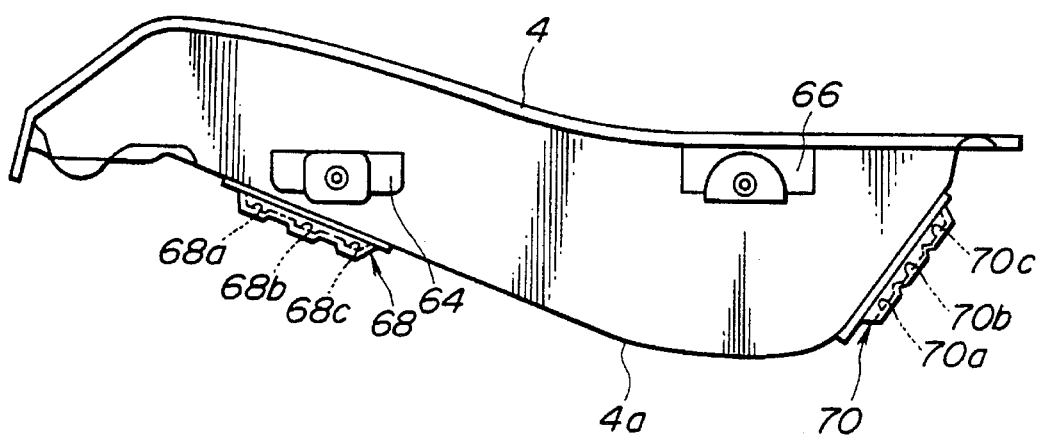
FIG. 21 is a side view of the seat cushion frame of FIG. 20.

The seat cushion frame 4 is a pan frame which comprises opposed side walls, a back wall, and a curved bottom wall 4a (see. FIG. 21). Each side wall of the seat cushion frame 4 is equipped with front and rear holders 64 and 66 through which the seat cushion frame 4 is tightly mounted on the movable rail of the seat slide device 3 or 3'.

In the fifth embodiment, the following measure is employed for providing seat 1E with a robust construction.

As is seen from FIG. 19, laterally extending front and rear reinforcing plates 68 and 70 are secured to the curved bottom wall 4a of the seat cushion frame 4. That is, as is understood from FIGS. 20 and 21, the front reinforcing plate 68 is secured to a front portion of the curved bottom wall 4a, while the rear reinforcing plate 70 is secured to a rear portion of the bottom wall 4a. Each reinforcing plate 68 or 70 is formed with longitudinally extending projections or ridges 68a, 68b, and 68c (or 70a, 70b, and 70c) for increasing the mechanical strength thereof.

When a marked impact force is applied to the seat 1E from a lateral direction due to a side vehicle collision or the like, the force is transmitted to the seat 1E through the mounting brackets 56 and the seat slide devices 3 and 3'. However, due to provision of the front and rear reinforcing plates 68 and 70, the seat 1E, particularly, the seat cushion portion 4 is prevented from being deformed thereby providing a seat occupant with a safely accommodating zone.

Figure 24:
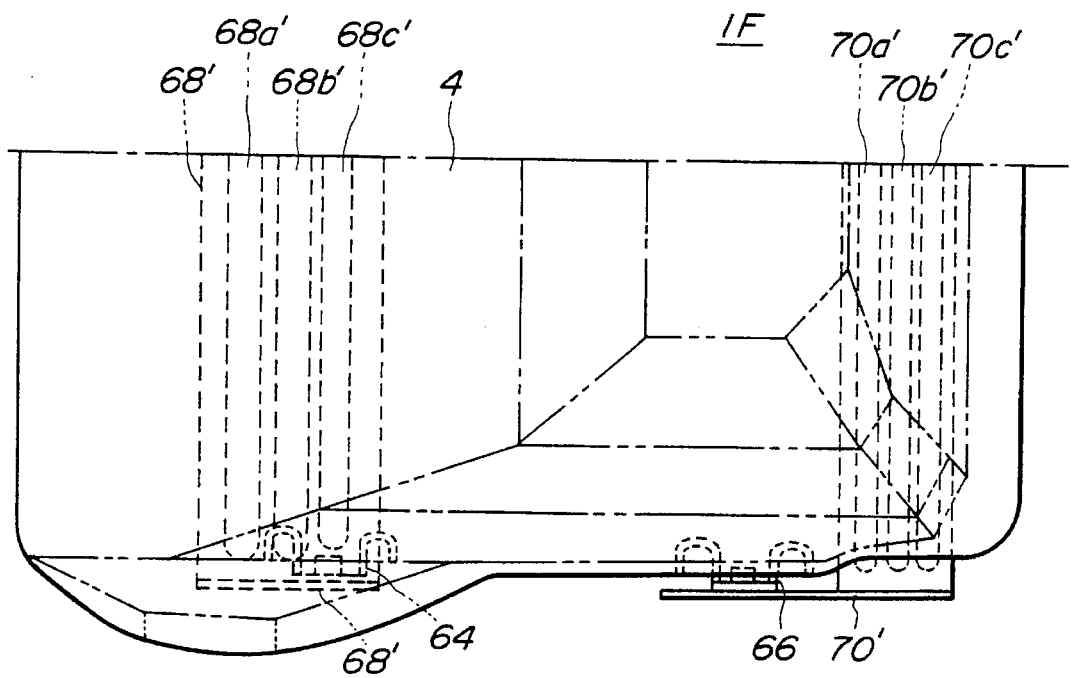
FIG. 24 is a view similar to FIG. 20, but showing a sixth embodiment of the present invention.
Figure 25:
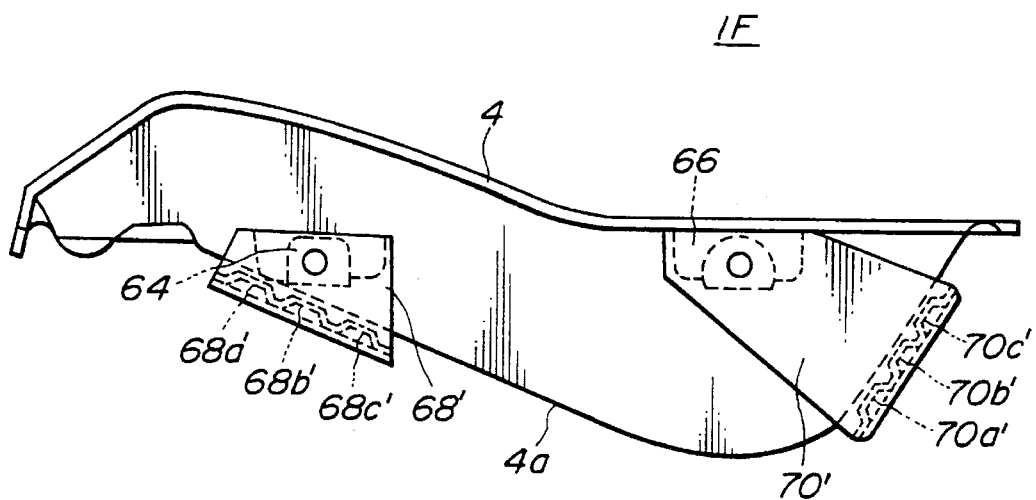
FIG. 25 is a side view of the seat cushion frame of FIG. 24.

Referring to FIGS. 24 and 25, there is shown an automotive seat which is a sixth embodiment of the present invention.

The seat 1F of this sixth embodiment is substantially the same as the seat 1E of the above-mentioned fifth embodiment except the front and rear reinforcing plates 68 and 70.

That is, in the sixth embodiment, each of the front and rear reinforcing plates 68' and 70' has both ends bent upward. The bent ends of the front reinforcing plate 68' are held by the front holders 64 and the bent ends of the rear reinforcing plate 70' are held by the rear holders 66. Similarly to the above mentioned fifth embodiment, the front (and rear) reinforcing plate 68' (and 70') is formed with longitudinally extending projections or ridges 68a', 68b' and 68c' (and 70a', 70b' and 70c').

What is claimed is:

1. In a motor vehicle having a floor, a side sill extending along a side edge of the floor, and a tunnel portion formed on a laterally middle portion of the floor and extending along said side sill, a robust seat assembly comprising:

a seat slide device mounted on said floor between said side sill and said tunnel portion, said seat slide device including two stationary rails which are mounted on said floor through respective mounting brackets and two movable rails which move on said stationary rails in a given direction along said side sill, said two mounting brackets being spaced apart from each other in a direction perpendicular to said given direction;

a seat including a seat cushion frame mounted on said movable rails to move therewith, a seatback frame, and paired pivot devices through which said seatback frame is pivotally connected to said seat cushion frame;

a reinforcing structure for providing the seat with a tough resistance against a side vehicle collision, said reinforcing structure including a reinforcing beam secured to said mounting brackets, said reinforcing beam having an outwardly extending end secured to said side sill and an inwardly extending end secured to said tunnel portion;

a first flange plate secured to said outwardly extending end of said reinforcing beam and connected to said side sill; and a second flange plate secured to said inwardly extending end of said reinforcing beam and connected to said tunnel portion.

2. A robust seat assembly as claimed in claim 1, further comprising another bracket which is secured to a top of said tunnel portion, said other bracket being secured to said second flange plate of said reinforcing beam.

* * * * *